US007796374B2

(12) United States Patent
Mori et al.

(10) Patent No.: US 7,796,374 B2

(45) Date of Patent: Sep. 14, 2010

(54) POWER SWITCHGEAR

(75) Inventors: Tomohito Mori, Chiyoda-ku (JP); Kyoichi Otsuka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 7 days.

(21) Appl. No.: 12/275,558

(22) Filed: Nov. 21, 2008

(65) Prior Publication Data

US 2010/0014218 A1 Jan. 21, 2010

(30) Foreign Application Priority Data

Jul. 15, 2008 (JP) ............................ 2008-183762

(51) Int. Cl.
*H02B 7/00* (2006.01)

(52) U.S. Cl. ....................... 361/619; 361/605; 361/632; 218/120; 218/154

(58) Field of Classification Search ..................... 361/3, 361/5, 62, 600–605, 611–624; 218/1, 2, 218/7, 52, 62, 64, 79, 80, 90, 14, 78, 84, 218/118, 134, 143, 154, 120, 103, 106, 152, 218/153; 200/23, 50.01, 50.02, 50.21, 50.23, 200/48 R, 17 R, 400, 401, 500, 501, 318, 200/320, 293, 308; 174/70 B, 73.1; 411/508

See application file for complete search history.

(56) References Cited

U.S. PATENT DOCUMENTS 3,251,970 A * 5/1966 Gonek et al. .................. 218/82
3,527,910 A * 9/1970 Kline et al. ................. 218/120
3,594,525 A * 7/1971 Miller et al. ................... 218/4
3,845,263 A * 10/1974 Dickinson ................... 200/400
4,225,763 A * 9/1980 Barkan ....................... 218/120
4,513,208 A * 4/1985 Kamata ...................... 307/139
5,107,081 A * 4/1992 Aoyama et al. ............... 218/84
5,604,340 A * 2/1997 Yamada et al. .............. 218/143
5,864,108 A * 1/1999 Rohling et al. .............. 218/134
5,912,604 A * 6/1999 Harvey et al. .................. 335/9
6,407,908 B1 * 6/2002 Iryo et al. ................... 361/604
6,437,276 B1 * 8/2002 Bruchmann et al. ......... 218/152
6,631,075 B2 * 10/2003 Kashima et al. ............. 361/605
6,696,658 B2 * 2/2004 Kowalyshen et al. ........ 218/154
7,091,439 B2 * 8/2006 Vaghini et al. .............. 218/154
7,211,761 B2 * 5/2007 Vaghini et al. ................. 218/7
7,485,807 B2 * 2/2009 Dambietz et al. ......... 174/72 B

FOREIGN PATENT DOCUMENTS

JP 406349383 A * 12/1994
JP 02000078712 A * 3/2000
JP 2001-118474 A 4/2001

* cited by examiner

*Primary Examiner*—Michael V Datskovskiy

(74) *Attorney, Agent, or Firm*—Buchanan Ingersoll & Rooney PC

(57) ABSTRACT

A power switchgear includes a circuit breaker including a container filled with an insulating gas, a stationary contact arranged in the container, and a movable contact that makes a movement to make contact with the stationary contact; an operation unit including a biasing member, and opens and closes the circuit breaker; and a linkage unit that transmits an biasing force of the biasing member to the circuit breaker. The linkage unit includes a rotary shaft, a lever including an engaging hole to be engaged with an outer periphery of the rotary shaft, and a pressing member that presses the rotary shaft onto an inner periphery of the engaging hole.

9 Claims, 5 Drawing Sheets

POWER SWITCHGEAR

BACKGROUND OF THE INVENTION

1. Field of the Invention

The present invention relates to a power switchgear to be installed in a sub station or the like.

2. Description of the Related Art

A conventional power switchgear (hereinafter, "a switchgear") such as one disclosed in Japanese Patent Application Laid-open No. 2001-118474 includes an operation unit and a circuit breaker. The operation unit includes an output shaft to transmit a rotary torque generated by a spring as a driving force charged in advance manually or by a motor. The circuit breaker includes a grounding container filled with an insulating gas, and a stationary contact and a movable contact arranged in the grounding container. The movable contact makes a movement to make contact with the stationary contact. The movable contact is connected to linkage units such as links and levers and a rotary shaft on the grounding container side. The operation unit is accommodated in an operation box that is arranged under the grounding container. With this configuration, a rotary torque transmitted from the output shaft is transmitted to the movable contact through the rotary shaft, the linkage members, and the levers.

In this circuit breaker, outer peripheries of the output shaft and the rotary shaft and corresponding inner peripheries of cylindrical coupling members are gear-shaped or spline-shaped (hereinafter, "a gear shape"). The output shaft is connected to the rotary shaft via the coupling member to operate in conjunction with the rotary shaft.

However, for assemblability, an inner diameter of the coupling member is essentially larger than an outer diameter of the output shaft or the rotary shaft in the switchgear disclosed in Japanese Patent Application Laid-open No. 2001-118474. This causes a clearance between the coupling member and the output shaft or the rotary shaft and leads to delay in mechanical movement or an undesirable rotational angle when rotational motion by the output shaft is transmitted to the rotary shaft. This may adversely affect mechanical properties of the circuit breaker.

SUMMARY OF THE INVENTION

It is an object of the present invention to at least partially solve the problems in the conventional technology.

According to an aspect of the present invention, there is provided a power switchgear including a circuit breaker that includes a container filled with an insulating gas, a stationary contact arranged in the container, and a movable contact that makes a movement to make contact with the stationary contact; an operation unit that includes a biasing member, and opens and closes the circuit breaker; and a linkage unit that transmits an biasing force of the biasing member to the circuit breaker, the linkage unit including a rotary shaft, a lever that includes an engaging hole to be engaged with an outer periphery of the rotary shaft, and a pressing member that presses the rotary shaft onto an inner periphery of the engaging hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
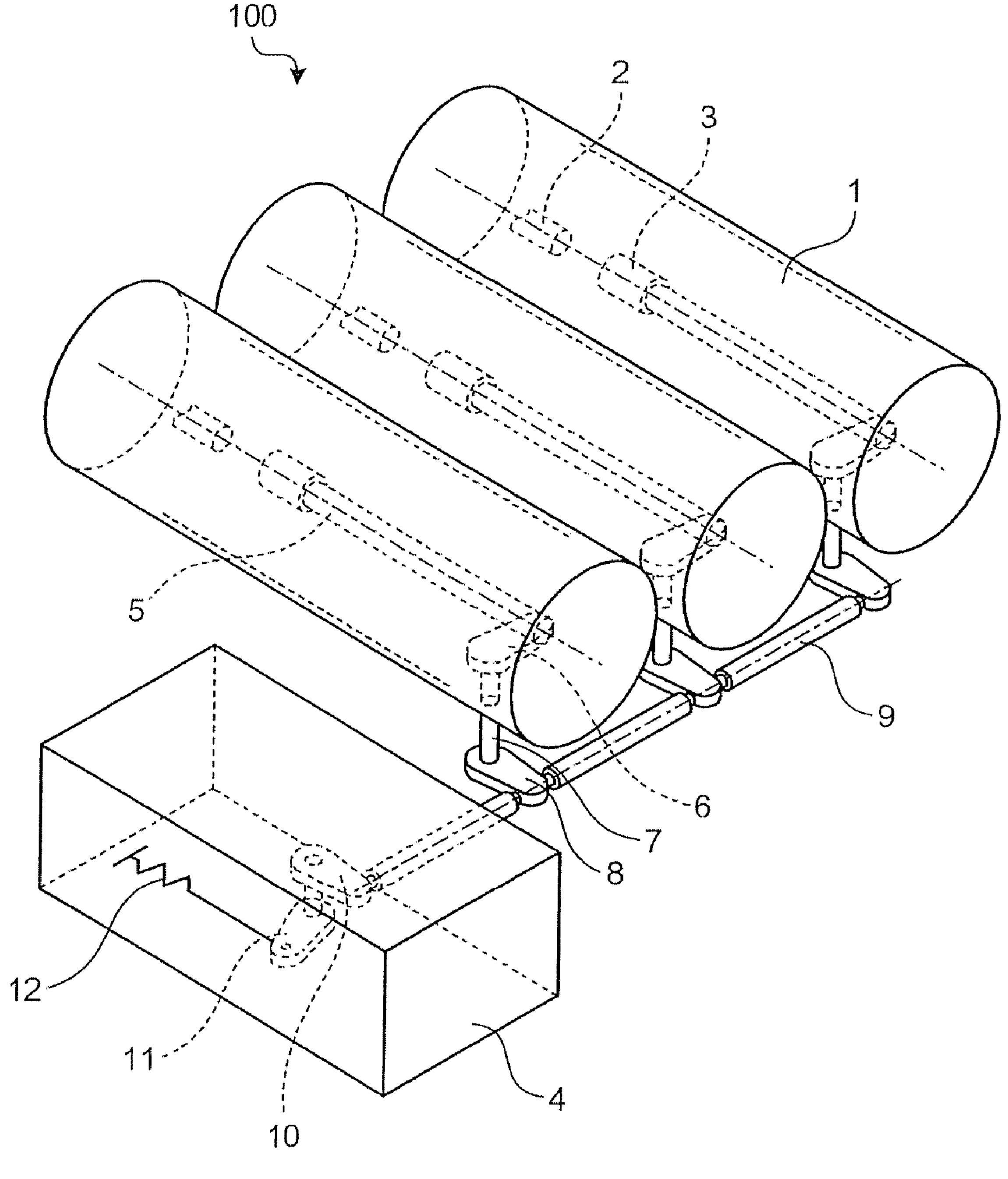
FIG. 1 is a perspective view of a switchgear according to a first embodiment of the present invention.

FIG. 1 is a perspective view of a switchgear 100 according to a first embodiment of the present invention. The switchgear 100 includes grounding containers 1, an operation unit 4, stationary contacts 2, movable contacts 3, pressing elements 5, levers 6, rotary shafts 7, levers 8, linkage members 9, an output lever 10, a cutoff lever 11, and a spring 12.

The switchgear 100 is configured to open or close a circuit breaker per alternating current phase. For example, the switchgear 100 includes three grounding containers 1 and linkage units corresponding to the respective grounding containers 1 as shown in FIG. 1. The linkage units transmit a biasing force of the spring 12 to the movable contacts 3. Each of the linkage units includes, although not limited, the pressing element 5, the rotary shaft 7, the levers 6 and 8, and the linkage member 9. In addition, each of the linkage units includes a pressing member for pressing an outer periphery of the rotary shaft 7 against each mating inner periphery of the engaging holes formed in the levers 6 and 8.

The grounding container 1 is filled with an insulating gas. The grounding container 1 functions as a circuit breaker by having the stationary contact 2, the movable contact 3 arranged opposed to the stationary contact 2, and the pressing element 5 that moves the movable contact 3 toward and away from the stationary contact 2.

The lever 6 that is arranged inside the grounding container 1 includes a gear-shaped engaging hole with which a gear-shaped outer periphery of the rotary shaft 7 is engaged, so that rotary torque of the rotary shaft 7 is transmitted to the lever 6. The lever 6 further includes a pivot that pivotally supports the pressing element 5. With this configuration, the lever 6 swings around the engaging hole, so that a rotational motion of the rotary shaft 7 can be converted into a reciprocating motion of the pressing element 5.

The lever 8 that is arranged outside the grounding container 1 includes a pivot that pivotally supports the linkage member 9 and a gear-shaped engaging hole with which a gear-shaped outer periphery of the rotary shaft 7 is engaged. The lever 8 swings around the engaging hole, so that a reciprocating motion of the linkage member 9 can be converted into a rotational motion of the rotary shaft 7. The outer periphery of the rotary shaft 7 and the engaging holes of the levers 6 and 8 can be formed into any shape so long as transmission of the rotational torque of the rotary shaft 7 to the levers 6 and 8 is possible.

The linkage members 9 connect each of the levers 8 for each phase to the output lever 10 in the operation unit 4, so that a biasing force of the spring 12 can be transmitted to each of the levers 8. The cutoff lever 11 is connected to the spring 12 in which a biasing force has been charged in advance manually or by a motor (not shown). The output lever 10 and the cutoff lever 11 are connected to be integrally rotated by a biasing force of the spring 12. The structures of the output lever 10 and the cutoff lever 11 are the same as those of the levers 6 and 8, which therefore will not be explained.

Figure 2:
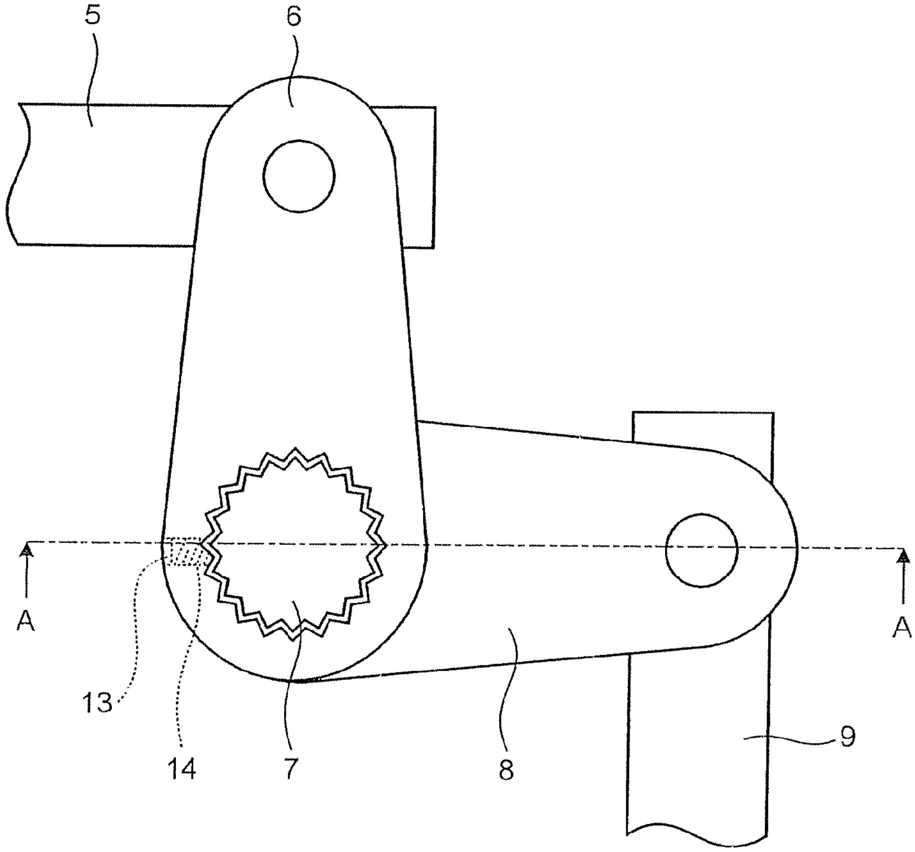
FIG. 2 is a plan view of part of a linkage unit shown in FIG. 1.

FIG. 2 is a plan view of part of a linkage unit according to the first embodiment. The rotary shaft 7 has a gear-shaped cross section, and each engaging hole formed in the levers 6 and 8 is formed into a gear shape to be engaged with the rotary shaft 7.

As shown in FIG. 2, there is a clearance between the rotary shaft 7 and the engaging hole in each of the levers 6 and 8. To address this clearance, each of the levers 6 and 8 has a through hole 13 that reaches the rotary shaft 7. A screw 14 is inserted into the through hole 13 to press the rotary shaft 7 against the engaging hole, whereby the clearance between the rotary shaft 7 and the engaging hole is eliminated.

Figure 3:
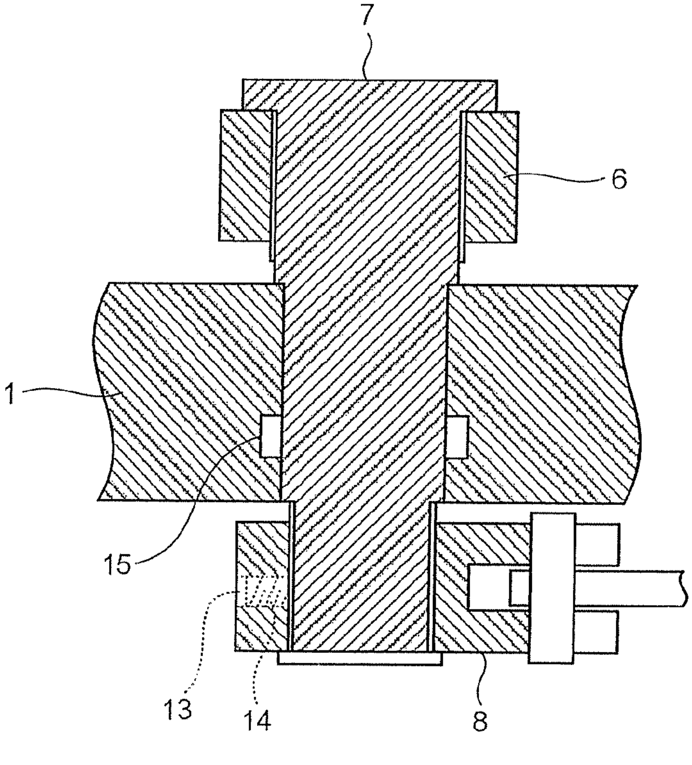
FIG. 3 is a cross sectional view of the linkage unit taken along line A-A of FIG. 2.

FIG. 3 is a cross sectional view of part of the linkage unit taken along line A-A of FIG. 2. As shown in FIG. 3, the rotary shaft 7 is engaged with the engaging hole of the lever 8 in the lower portion while the screw 14 is inserted into the through hole 13 formed in the lever 8. Although not shown in FIG. 3, the rotary shaft 7 is engaged with the lever 6 in the upper portion in the same manner.

A sealing member 15 having a predetermined thickness is provided around the rotary shaft 7 to prevent gas leakage from the grounding container 1 or air entry into the grounding container 1.

As mentioned above, because each of the levers 6 and 8 has the through hole 13, the screw 14 inserted into the through hole 13 presses the rotary shaft 7 to shift the central axis of the rotary shaft 7 from a center of the engaging hole. In other words, the linkage unit includes a pressing member to press the outer periphery of the rotary shaft 7 against the inner periphery of each of the engaging holes in the levers 6 and 8. The screw 14 serves as the pressing member.

According to the first embodiment, a clearance at an engaging portion of a shaft and a mating hole is eliminated by pressing the outer periphery of the shaft against the inner periphery of the mating hole, so that rotational angular deviation at each linkage unit can be eliminated. As a result, disadvantageous movements such as operational delay of a lever, insufficient rotation of a rotary shaft, or uncoupled operations of circuit breakers among a plurality of phases that may adversely influence mechanical properties of a switchgear can be eliminated. Furthermore, energy saving and prolonged durability of a switchgear are attainable because of elimination of unintended mechanical movements in the switchgear.

Figure 4:
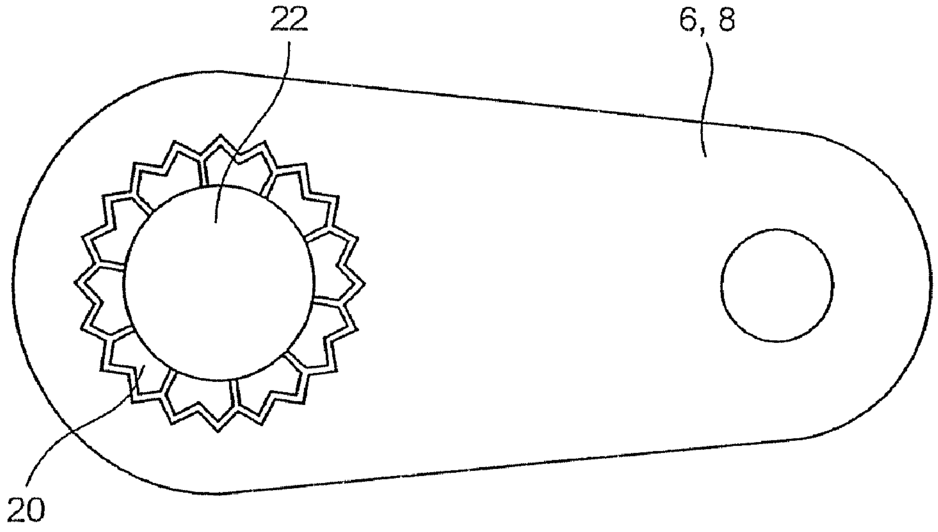
FIG. 4 is a plan view illustrating a state in which a rotary shaft is engaged with a lever according to a second embodiment of the present invention.

FIG. 4 is a plan view illustrating a state in which a rotary shaft 20 is engaged with the lever 6 (or the lever 8) according to a second embodiment of the present invention. Other members associated with the rotary shaft. 20 and the levers 6 and 8 are as shown in FIG. 2.

The rotary shaft 20 is cylindrical and includes a number of axially segmented portions. An outer periphery of the rotary shaft 20 is gear shaped same as that of the rotary shaft 7 in the first embodiment. Moreover, an inner periphery of each of engaging holes in the levers 6 and 8 is gear shaped same as that of the rotary shaft 20, so that the outer periphery of the rotary shaft 20 is engaged with the inner periphery of the engaging hole in the lever 6 or 8.

Figure 5:
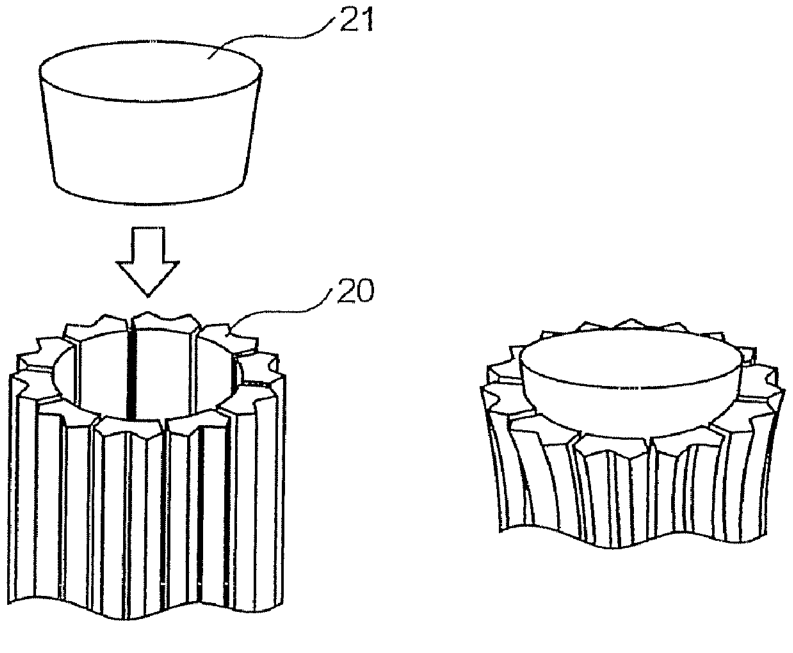
FIG. 5 is a perspective view for explaining engagement of a columnar member with an end portion of the rotary shaft shown in FIG. 4.

FIG. 5 is a perspective view for explaining engagement of a columnar member 21 with an end portion of the rotary shaft 20. The columnar member 21 can be press-inserted into a hollow portion 22 (shown in FIG. 4) of the rotary shaft 20. When the columnar member 21 is press-fitted into the hollow portion 22 after the rotary shaft 20 has been inserted into the levers 6 and 8 (both are not shown in FIG. 5), the columnar member 21 presses the end portion of the rotary shaft 20 outwardly. As a result, the outer periphery of the rotary shaft 20 can be made fitted with the inner periphery of each of the engaging holes in the levers 6 and 8. In other words, the linkage unit includes a pressing member to press an outer periphery of the rotary shaft against a mating inner periphery of the engaging hole formed in each lever. The columnar member 21 serves as the pressing member.

The columnar member 21 is not limited to a columnar shape and can be formed into, for example, a tapered shape. The columnar member 21 can be made of an elastic material. When the columnar member 21 is made of an elastic material, the columnar member 21 in a compressed state can be inserted into the hollow portion 22 and expands the rotary shaft 20 outwardly by an expansion force. The rotary shaft 20 can have a tapered inner periphery and axially segmented portions.

Figure 6:
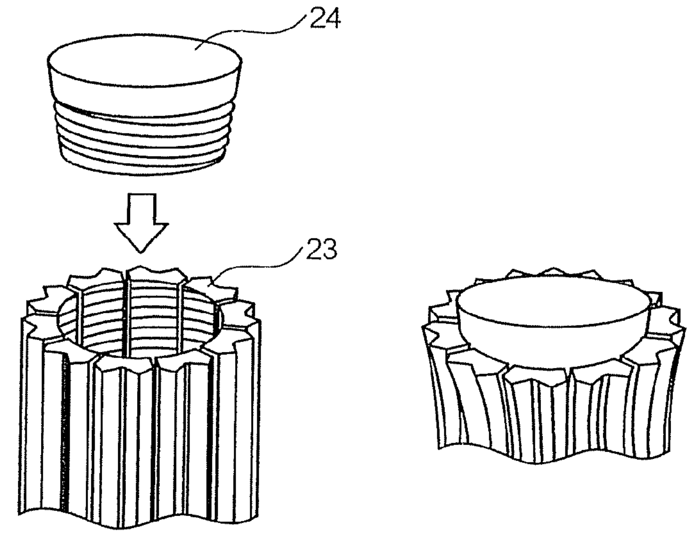
FIG. 6 is a perspective view for explaining engagement of a threaded columnar member with an end portion of a rotary shaft having a threaded inner periphery.

FIG. 6 is a perspective view for explaining engagement of a columnar member 24 with an end portion of a rotary shaft 23 having a threaded inner periphery. The rotary shaft 23 is cylindrical with a threaded inner periphery and includes a number of axially segmented portions. The columnar member 24 is threaded to be screwed into the rotary shaft 23. When the columnar member 24 is screwed into the hollow portion 22 after the rotary shaft 23 has been inserted into each of engaging holes in the levers 6 and 8 (both are now shown in FIG. 6), the columnar member 24 presses the end portion of the rotary shaft 23 outwardly. As a result, the outer periphery of the rotary shaft 23 can be made fitted with the inner periphery of the engaging hole. In other words, the linkage unit includes a pressing member to press an outer periphery of the rotary shaft against a mating inner periphery of the engaging hole formed in each lever. The columnar member 24 serves as the pressing member.

According to the second embodiment, in addition to the above effects, workability in assembling the linkage units or the like can be improved by using a tapered columnar member. Moreover, use of a threaded tapered columnar member further facilitates the workability and prevents disengagement of the tapered columnar member.

Figure 7:
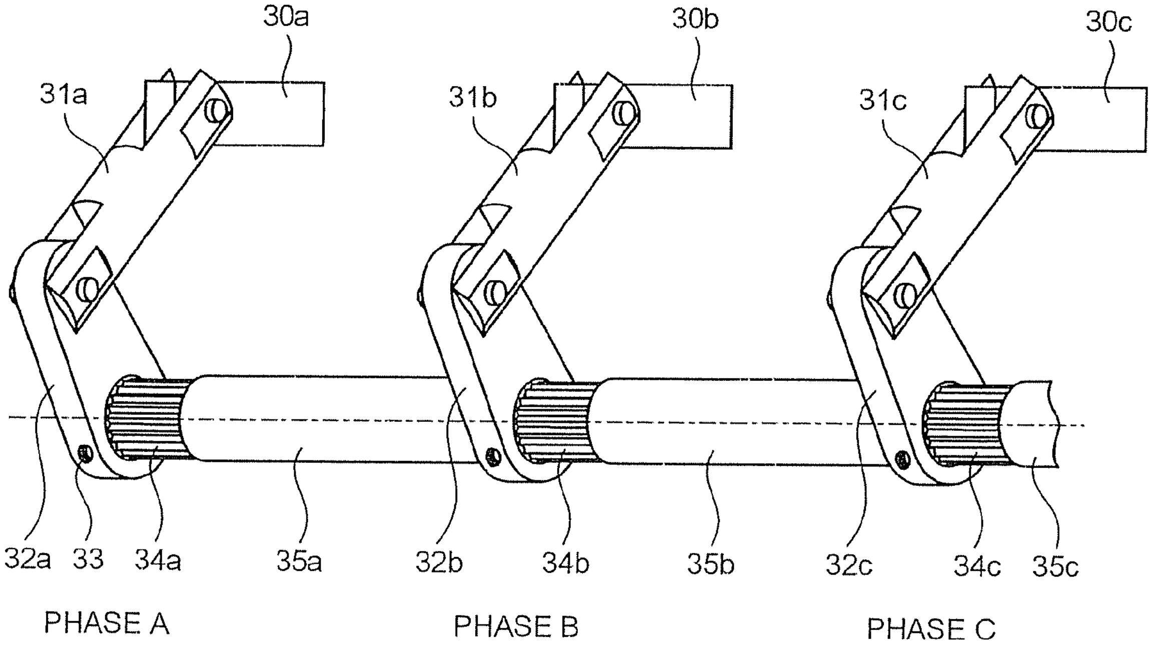
FIG. 7 is a perspective view of linkage units according to a third embodiment of the present invention.

FIG. 7 is a perspective view of linkage units according to a third embodiment of the present invention. Each of the linkage units corresponds to the pressing element 5, the lever 6, the rotary shaft 7, the lever 8, and the linkage member 9 shown in FIG. 1. In each of the linkage units shown in FIG. 7, either one of the lever 6 or 8, and the rotary shaft 7 are omitted. In place of the linkage members 9 shown in FIG. 1, rotary shafts 34*a*, 34*b*, and 34*c*, and coupling members 35*a*, 35*b*, and 35*c* are used for interconnecting phases.

The linkage unit that includes a pressing element 30*a*, a link 31*a*, and a lever 32*a* transmits a driving force to move the movable contact 3 of phase A shown in the left side in FIG. 1. The linkage unit for phase B (shown in the middle in FIG. 1) and the linkage unit for phase C (shown in the right side in FIG. 1) function in the same manner as the linkage unit for phase A.

The phases A and B are connected with a linkage rod unit including the rotary shaft 34*a* and the coupling member 35*a*, and the phases B and C are connected with a linkage rod unit including the rotary shaft 34*b* and the coupling member 35*b*. A linkage rod unit including the rotary shaft 34*c* and the coupling member 35*c* (shown in the lower right in FIG. 7) corresponds to an output shaft that is connected to the operation unit 4 shown in FIG. 1, and therefore transmits a rotary torque from the operation unit 4 to each phase. The linkage units for the phases A, B, and C are configured to operate in conjunction with one another by the rotary torque. An outer periphery of each of the rotary shafts 34*a*, 34*b*, and 34*c*, and an inner periphery of each of engaging holes in the levers 32*a*, 32*b*, and 32*c* are gear shaped.

As mentioned in the first embodiment, there is a clearance between each of the rotary shafts 34*a*, 34*b*, and 34*c* and corresponding each engaging hole in the levers 32*a*, 32*b*, and 32*c*. Each of the levers 32*a*, 32*b*, and 32*c* has a through hole that reaches corresponding each of the rotary shafts 34*a*, 34*b*, and 34*c*. A screw 33 is inserted into the through hole to press the rotary shaft against the engaging hole, whereby the clearance can be eliminated. In other words, the linkage unit includes a pressing member to press an outer periphery of each rotary shaft against a mating inner periphery of the engaging hole formed in each lever. The screw 33 serves as the pressing member that presses each shaft so that each central axis of the rotary shafts is shifted from a center of corresponding each inner periphery of the engaging holes.

Figure 8:
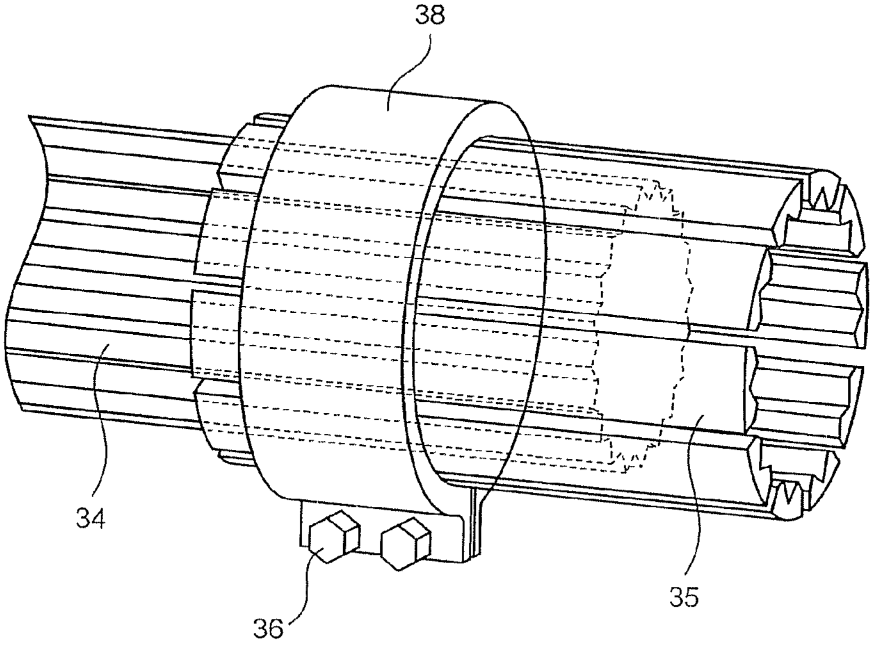
FIG. 8 is a perspective view of a rotary shaft and a coupling member shown in FIG. 7, and a ring.

FIG. 8 is a perspective view of a rotary shaft 34 (corresponding to the rotary shafts 34*a*, 34*b*, and 34*c* in FIG. 7) and a coupling member 35 (corresponding to the coupling members 35*a*, 35*b*, and 35*c* in FIG. 7) according to the third embodiment of the present invention.

The coupling member 35 is cylindrical and axially segmented to be detachable. An inner periphery of the coupling member 35 is gear shaped to be engaged with an outer periphery of the rotary shaft 34. With this configuration, a driving force from the spring 12 is transmitted to the rotary shaft 34.

The coupling member 35 is surrounded by an annular ring 38, which is fastened by bolts 36 provided at the ends thereof, whereby the segmented portions of the coupling member 35 are pressed toward a center thereof to fit the rotary shaft 34.

Figure 9:
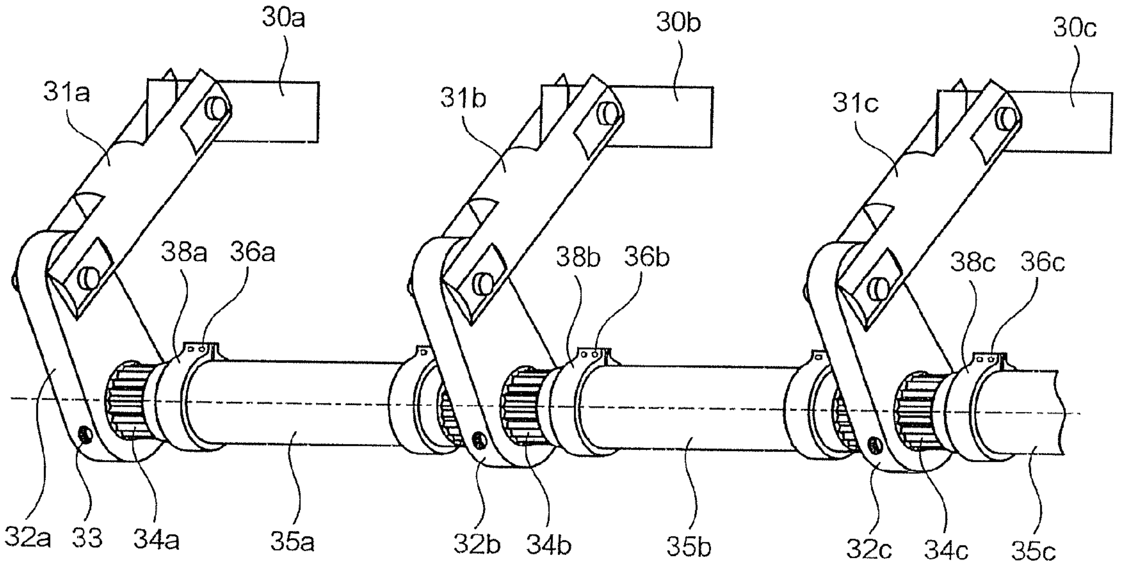
FIG. 9 is a perspective view of linkage units, each of which includes the rotary shaft, the coupling member, and the ring shown in FIG. 8.

FIG. 9 is a perspective view of linkage units. Rings 38*a*, 38*b*, and 38*c* correspond to the ring 38 shown in FIG. 8, the coupling members 35*a*, 35*b*, and 35*c* correspond to the coupling member 35, and bolts 36*a*, 36*b*, and 36*c* correspond to the bolts 36.

The phases A and B are connected with a linkage rod unit including the rotary shaft 34*a*, the coupling member 35*a*, and the ring 38*a*, and the phases B and C are connected with a linkage rod unit including the rotary shaft 34*b*, the coupling member 35*b*, and the ring 38*b*. A linkage rod unit including the rotary shaft 34*c*, the coupling member 35*c*, and the ring 38*c* corresponds to the output shaft that is connected to the operation unit 4 as shown in FIG. 1, and therefore transmits a rotary torque from the operation unit 4 to the linkage units for the phases A, B, and C, whereby the linkage units can operate in conjunction with one another by the rotary torque.

According to the third embodiment, in addition to the above effects, a rotary torque from an operation unit can be uniformly transmitted to levers for a plurality of phases. As a result, an adverse effect due to operational fluctuation in circuit breakers among the phases can be eliminated. Furthermore, coupling members are configured to be easily detachable without disassembling all of the linkage units, so that assemblability and workability have can be improved. Moreover, easy angular adjustment of a lever has been realized.

According to an aspect of the present invention, a pressing member is provided, so that rotational angular deviation at an engaging portion of a shaft and a mating hole can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power switchgear comprising: a circuit breaker that includes
- a container filled with an insulating gas,
- a stationary contact arranged in the container, and
- a movable contact that makes a movement to make contact with the stationary contact;
- an operation unit that includes a biasing member, and opens and closes the circuit breaker; and
- a linkage unit that transmits a biasing force of the biasing member to the circuit breaker, the linkage unit including
- a rotary shaft defining a cylindrical shape and including a plurality of axially segmented portions,
- a lever defining an engaging hole configured to receive the rotary shaft, and
- a pressing member that presses the rotary shaft outwardly within the engaging hole onto an inner periphery of the lever defining the engaging hole.

2. The power switchgear according to claim 1, wherein
- the pressing member is an elastic columnar member configured to expand the rotary shaft outwardly when inserted into the rotary shaft.

3. The power switchgear according to claim 1, wherein
- the rotary shaft defines a tapered inner periphery, and
- the pressing member is a columnar member that presses the rotary shaft outwardly when being inserted into the rotary shaft.

4. The power switchgear according to claim 3, wherein
- an inner periphery of the rotary shaft is threaded, and
- an outer periphery of the columnar member is threaded to be fitted with the inner periphery of the rotary shaft.

5. The power switchgear according to claim 1, wherein
- the circuit breaker includes a plurality of circuit breakers,
- the lever includes a plurality of levers,
- the linkage unit includes a plurality of linkage units that interconnects the levers, and
- the linkage units operate in conjunction with the biasing force of the biasing member.

6. The power switchgear according to claim 1, wherein the biasing member is a spring.

7. A power switchgear including a circuit breaker, the circuit breaker comprising:
- a container filled with an insulating gas,
- a stationary contact arranged in the container,
- a movable contact that makes a movement to make contact with the stationary contact;
- an operation unit that includes a biasing member, and opens and closes the circuit breaker; and a linkage unit that transmits a biasing force of the biasing member to the circuit breaker, the linkage unit including:

a rotary shaft, a lever defining an engaging hole configured to receive at least a portion of the rotary shaft, a cylindrical coupling member that includes axially segmented portions and is fitted with the rotary shaft to transmit the biasing force to the rotary shaft; and an annular ring that surrounds the coupling member and presses the coupling member toward a central axis of the coupling member by fastening a bolt provided at an end portion of the annular ring.

8. The power switchgear according to claim 7, further comprising:

a through hole defined by the lever, and a screw configured to be inserted into the through hole to press the rotary shaft such that a center of the rotary shaft shifts from a center of the engaging hole.

9. The power switchgear according to claim 8, wherein the circuit breaker includes a plurality of circuit breakers, the lever includes a plurality of levers, the linkage unit includes a plurality of linkage units that interconnects the levers, and the linkage units operate in conjunction with the biasing force of the biasing member.

* * * * *